United States Patent [19]

Meguerian et al.

[11] 3,953,576

[45] Apr. 27, 1976

[54] MAXIMIZING CONVERSION OF NITROGEN OXIDES IN THE TREATMENT OF COMBUSTION EXHAUST GASES

[75] Inventors: Garbis H. Meguerian, Olympia Fields, Ill.; Yasuo Kaneko, Takatsuki, Japan

[73] Assignees: Standard Oil Company, Chicago, Ill.; Mitsubishi Motors Corporation, Japan

[22] Filed: Feb. 13, 1974

[21] Appl. No.: 442,246

[52] U.S. Cl. .............................. 423/213.7; 60/299; 23/288 FB
[51] Int. Cl.$^2$ ........................................ B01D 53/00
[58] Field of Search ..................... 423/213.5, 213.7; 60/301; 23/288 FB

[56] References Cited
UNITED STATES PATENTS

| | | | |
|---|---|---|---|
| 2,601,221 | 6/1952 | Rosenblatt et al. | 423/351 |
| 3,809,743 | 5/1974 | Unland et al. | 423/213.5 |
| 3,825,654 | 7/1974 | Kobylinski et al. | 423/213.7 |
| 3,832,443 | 8/1974 | Hass | 423/213.7 |

OTHER PUBLICATIONS

Meguerian et al., "Nox Catalysts for Vehicle Emission Control" SAE Paper 720480, 1972, pp. 16–18.

*Primary Examiner*—G. O. Peters
*Attorney, Agent, or Firm*—James L. Wilson; Arthur G. Gilkes; William T. McClain

[57] ABSTRACT

A three-catalyst process for maximizing the conversion of nitrogen oxides during the treatment of combustion exhaust gases is provided. This process comprises in sequence contacting combustion exhaust gas in a first zone with a nitrogen-oxide-reduction catalyst to form a nitrogen-oxide-reduced gas; introducing a first stream of secondary air into said nitrogen-oxide-reduced gas to form a first air-gas mixture; contacting said first air-gas mixture in a second zone with a catalyst for decreasing ammonia to form a gas containing decreased amounts of ammonia; introducing a second stream of secondary air into said gas containing decreased amounts of ammonia to form a second air-gas mixture; and contacting said second air-gas mixture in a third zone with an oxidation catalyst for the oxidation of carbon monoxide and hydrocarbons to form purified exhaust gas. The first stream of secondary air provides about 3 to about 8 volume percent air, based on the volume of primary air being employed in the combustion, while the second stream of secondary air is sufficient, when added to the oxygen remaining in the gas containing decreased amounts of ammonia, to provide substantially complete oxidation of the carbon monoxide and hydrocarbons in the gas containing decreased amounts of ammonia.

The process may be employed to treat automobile exhaust gases.

4 Claims, 2 Drawing Figures

EFFECT OF SECONDARY AIR ADDED TO EFFLUENT FROM FIRST ZONE

MAXIMIZING CONVERSION OF NITROGEN OXIDES IN THE TREATMENT OF COMBUSTION EXHAUST GASES

BACKGROUND OF THE INVENTION

One of the sources of pollutants to the air comprises the exhaust gases from automobiles and non-mobile combustion sources. Such exhaust gases contain not only carbon monoxide and hydrocarbons, but also various nitrogen oxide gases. The concentrations of such contaminants in the air will have to be lowered in the near future. It is contemplated that relatively low levels of nitrogen oxide gases will be established for automobile exhaust gases. It is also contemplated that substantially all of the carbon monoxide and unburned hydrocarbons that are present in an exhaust gas will have to be eliminated.

Various systems for treating such exhaust gas contaminants have been proposed. Such proposed systems include a two-stage catalytic converter. The first stage in this catalytic converter treats the exhaust gases that are coming directly from the exhaust system under reducing conditions. In the first stage, the nitrogen oxide gases in the exhaust gas react with hydrocarbons, hydrogen, and carbon monoxide in the gas. The gaseous effluent coming from this first stage is then passed through the second stage, where unburned hydrocarbons and carbon monoxide react with oxygen in the gas, the oxygen having been added to the effluent from the first stage prior to its introduction into the second stage. In the proposed two-stage catalytic converters, each stage contains a type of catalyst that may be different from the catalyst in the other stage. The two-stage converter requires that the internal combustion engine which is emitting the exhaust gases be operated at fuel-rich conditions. Fuel-rich conditions ensure the presence of sufficient carbon monoxide and hydrocarbons to react with the nitrogen oxide gases in the first stage of such two-stage catalytic converter.

The catalyst in the first stage of such two-stage catalytic converter is called the $NO_x$ catalyst. This catalyst promotes the reduction of nitrogen oxide. It is to be understood that several different and sometimes competing reactions can and do occur as the exhaust gases flow over the $NO_x$ catalyst. The most important of these reactions are:

$$NO_x + CO \rightarrow N_2 + CO_2 \qquad (1)$$

$$NO_x + H_2 \rightarrow NH_3 + N_2 + H_2O \qquad (2)$$

$$2CO + O_2 \rightarrow 2CO_2 \qquad (3)$$

$$2H_2 + O_2 \rightarrow 2H_2O \qquad (4)$$

The first two of the above reactions are the reactions that are responsible for eliminating $NO_x$ as an exhaust pollutant. The $NO_x$ catalyst favors such reactions rather than Reactions (3) and (4). Preferably, the $NO_x$ catalyst favors such reactions over a wide range of temperatures, e.g., about 700°F to about 1,700°F. Reaction (2) is an undesirable reaction because ammonia that has formed in the first stage of the converter will be converted to nitrogen oxide in the second stage. This will defeat, at least in part, the purpose of the converter. Consequently, a desirable $NO_x$ catalyst either will not promote Reaction (2) or will minimize the formation of ammonia in favor of nitrogen. However, such selective catalysts which are viable and useful for the emission control systems to be employed in automobiles, as well as in the treatment of exhaust gases from non-mobile sources, have not been developed yet.

There has now been developed a process for maximizing the conversion of nitrogen oxides in the treatment of exhaust gases, which process employs a three-catalyst system.

SUMMARY OF THE INVENTION

Broadly, according to the invention, there is provided a process for the purification of exhaust gas from the combustion of hydrocarbon materials to form a purified exhaust gas. This process comprises in sequence contacting said exhaust gas in a first zone with a nitrogen-oxide-reduction catalyst to form a nitrogen-oxide-reduced gas; introducing a first stream of secondary air into said nitrogen-oxide-reduced gas to form a first air-gas mixture, said first stream of secondary air providing about 3 to about 8 volume percent air, based on the volume of primary air that is employed in said combustion; contacting said first air-gas mixture in a second zone with a catalyst for decreasing ammonia to form a gas containing decreased amounts of ammonia; introducing a second stream of secondary air into said gas containing decreased amounts of ammonia to form a second air-gas mixture, said second stream of secondary air being sufficient, when added to the oxygen remaining in said gas containing decreased amounts of ammonia, to provide substantially complete oxidation of the carbon monoxide and hydrocarbons in said gas containing decreased amounts of ammonia; and contacting said second air-gas mixture in a third zone with an oxidation catalyst for the oxidation of carbon monoxide and hydrocarbons to form said purified exhaust gas.

BRIEF DESCRIPTION OF THE DRAWINGS

The operation of the process of the present invention and advantages thereof will be understood from the description of the invention which follows when read in conjunction with the accompanying figures.

DESCRIPTION AND PREFERRED EMBODIMENTS

Figure 1:
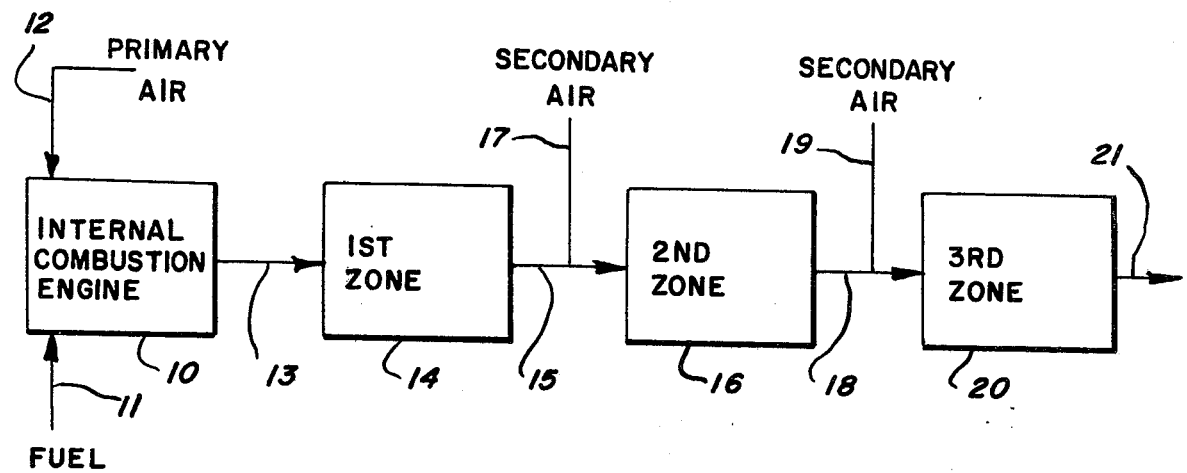
FIG. 1 represents a simplified schematic flow diagram of an embodiment of the process of the present invention.

When hydrocarbon materials are being burned, or specifically in the operation of an internal combustion engine, a certain amount of oxygen must be present in order to promote such combustion. Generally, a stream of air is employed as the source of such oxygen and this air may be identified as primary air. If the exhaust gases from such combustion are to be purified, the carbon monoxide and hydrocarbon pollutants in such exhaust gas must be oxidized through the addition of a certain amount of additional air, which is hereinafter identified as secondary air. When a prior-art two-stage catalytic conversion system is employed to purify the exhaust gases from the combustion of hydrocarbon materials, a stream of secondary air is introduced into the system between the first stage and the second stage. The effect of the amount of secondary air upon the oxidation of both carbon monoxide and hydrocarbons over the catalyst in the second stage, i.e., an oxidation catalyst, is well known. With an effective oxidation catalyst, when the amount of secondary air exceeds the stoichiometric amount necessary to oxidize all of the carbon monoxide and hydrocarbons present in the exhaust gases, almost complete oxidation of said carbon monoxide and hydrocarbons can occur. With less amounts of secondary air, incomplete oxidation of carbon monoxide and hydrocarbons results. However, the results of over-all conversion of the nitrogen oxides through the two-stage system are surprising. As the amount of secondary air is increased from 0 to about 6 volume percent, based on the amount of primary air used in the combustion of hydrocarbon materials, the over-all conversion of nitrogen oxides increases to a maximum. If more than 6 volume percent secondary air is employed, the over-all conversion of nitrogen oxides in the exhaust gas begins to decrease. It is known that this decrease in over-all conversion of nitrogen oxides is due probably to the oxidation of the ammonia that is produced over the first catalyst back to nitrogen oxides over the second catalyst.

While the mechanism related to the effect of the small amounts of secondary air is not understood fully, the mechanism suggested herein is presented for the purpose of illustration and information only and is not intended to limit the scope of the present invention. It is speculated that the following reactions may be responsible for the effect of up to 6 volume percent secondary air upon the reduction of the nitrogen oxide level over the oxidation catalyst:

$$4NH_3 + 5O_2 \rightarrow 4NO + 6H_2O \qquad (5)$$

$$6NO + 4NH_3 \rightarrow 5N_2 + 6H_2O \qquad (6)$$

According to this mechanism, a portion of the ammonia is oxidized to nitrogen oxide over the second catalyst. Then the nitrogen oxide reacts with the remaining ammonia to produce nitrogen and water. It is to be recognized that the amount of oxygen that is present is critical. If too much oxygen is present, all of the ammonia may be oxidized to nitrogen oxide at the expense of the desirable Reaction (6). However, in two-stage systems the amount of secondary air cannot be limited to about 6 volume percent for maximum nitrogen-oxide conversion because, at this level of secondary air, oxidation of carbon monoxide and hydrocarbons is not sufficiently high to meet emission standards.

The above critical use of oxygen may be advantageously employed in a catalytic conversion system using three catalysts. Such three-catalyst system employs in a first zone as a first catalyst a nitrogen-oxide-reduction catalyst, which may be either a pelleted catalyst or a catalyst comprising a monolithic support. As the second catalyst, the process employs in a second zone a catalyst which will decrease the amount of ammonia that is formed during the reduction of the nitrogen oxides. Such system employs in a third zone as the third catalyst that would normally oxidize carbon monoxide and hydrocarbons in the gaseous effluent passing over such catalyst. The second catalyst, which also would oxidize carbon monoxide and hydrocarbons in the presence of certain quantities of oxygen, must be employed in an atmosphere that contains only a selected amount of oxygen as specified hereinafter. The gaseous effluent from the first zone may contain a small amount of oxygen. This small amount of oxygen is augmented by that provided by about 3 volume percent to about 8 volume percent secondary air, which secondary air is introduced into the effluent from the first zone prior to its passage into the second zone of this three-catalyst system. The amount of secondary air is based on the amount of primary air that is employed in the combustion of the hydrocarbon materials. The gaseous effluent that is obtained from the second zone is then passed to the third zone, which contains the catalyst for the oxidation of carbon monoxide and the hydrocarbons. Sufficient secondary air is introduced into the gaseous effluent from the second zone prior to its passage into the third zone in order to furnish enough oxygen to provide substantially complete oxidation of the carbon monoxide and the hydrocarbons that are present in the gaseous effluent. Substantially complete oxidation comprises the oxidation of at least 90 percent of the carbon monoxide and hydrocarbons that are present in the gaseous effluent.

Typically, the total amount of secondary air is adjusted to provide 1 percent oxygen in the gas being emitted from the third zone of said process when the carbon monoxide content of the unpurified exhaust gas is about 2.5 volume percent. Such total amount of secondary air is approximately 15 percent, based on the amount of primary air being employed in the combustion of the hydrocarbon materials.

In the proposed three-catalyst system, sufficient secondary air is introduced into the exhaust gas being treated prior to its passage into the second zone to enable the ammonia in such gas to be decreased to a minimum level while still not being present in an amount that will enable the hydrocarbons and carbon monoxide present in the gas to be appreciably oxidized. Then sufficient oxygen is introduced into the effluent gas from the second zone to permit substantially complete oxidation of the carbon monoxide and hydrocarbons.

It is to be understood that each zone of the process of the present invention may be housed in its own container, or, in the alternative, two zones may be in one container and the other zone in a separate container, or all zones may be housed in the same container.

Broadly, according to the present invention there is provided a process for the purification of exhaust gas from the combustion of hydrocarbon materials to form a purified exhaust gas. This process comprises in sequence contacting said exhaust gas in a first zone with a nitrogen-oxide-reduction catalyst to form a nitrogen-oxide-reduced gas; introducing a first stream of secondary air into said nitrogen-oxide-reduced gas to form a first air-gas mixture, said first stream of secondary air providing about 3 volume percent to about 8 volume percent air, based on the volume of primary air being employed in said combustion; contacting said first air-gas mixture in a second zone with a catalyst for decreasing ammonia to form a gas containing decreased amounts of ammonia; introducing a second stream of secondary air into said gas containing decreased amounts of ammonia to form a second air-gas mixture, said second stream of secondary air being sufficient, when added to the oxygen remaining in said gas containing decreased amounts of ammonia, to provide substantially complete oxidation of the carbon monoxide and hydrocarbons in said gas containing decreased amounts of ammonia; and contacting said second air-gas mixture in a third zone with an oxidation catalyst for the oxidation of carbon monoxide and hydrocarbons to form said purified exhaust gas.

As pointed out hereinabove, the first catalyst employed in the process of the present invention may be any suitable nitrogen-oxide-reduction catalyst that promotes the formation of ammonia during the reduction of the nitrogen oxides. For example, the first catalyst may be a base metal catalyst containing nickel; nickel and copper; nickel, copper, and iron; nickel, copper, iron, and chromium; nickel, copper, and chromium; nickel, copper, cobalt, chromium, and iron; or combinations thereof on a suitable pelleted or monolithic support. The first catalyst may be one of the above base metal catalysts promoted with platinum, rhodium, and/or palladium; e.g., a catalyst containing nickel and rhodium, with or without platinum and/or palladium, on a monolithic ceramic support, as disclosed in United States patent application Ser. No. 336,256. Moreover, the first catalyst may be a catalyst comprising platinum, rhodium, or palladium, or combinations thereof on a suitable pelleted or monolithic support.

The second catalyst that is employed in the process of the present invention may be any of the catalysts that are enumerated hereinabove as being suitable for use as first catalysts. These second catalysts in the proper environment decrease the ammonia in the gas being treated thereby.

The third catalyst, which is employed to provide substantially complete oxidation of the carbon monoxide and hydrocarbons in the gas being treated, may be any commercially available noble-metal catalyst that is suitable for the oxidation of carbon monoxide and hydrocarbons.

In addition to the amount of secondary air that is employed in the process of the present invention, other operating conditions comprise a space velocity of about 25,000 hours$^{-1}$ to about 300,000 hours$^{-1}$ and a temperature of about 700°F. to about 1,600°F.

An embodiment of the present invention is schematically depicted in the accompanying FIG. 1. In this embodiment, the exhaust gases from internal combustion engine 10 are being purified. Hydrocarbons are introduced into engine 10 via line 11. To promote the combustion of the hydrocarbons in engine 10, a stream of primary air is introduced into the carburetor of engine 10 via line 12. The exhaust gas from engine 10 is passed through line 13 to first zone 14, which contains a catalyst that promotes the reduction of nitrogen oxide in the exhaust gas. The effluent from first zone 14 is then passed through line 15 to second zone 16, which contains a catalyst that will promote the decrease of ammonia in said exhaust gas. A first stream of secondary air is passed through line 17 to be introduced into line 15, where it is mixed with the exhaust gas being emitted from first zone 14. In second zone 16, the amount of ammonia that is present in the exhaust gas is minimized. The gaseous effluent from second zone 16 is then passed through line 18. A second stream of secondary air is introduced into line 18 by way of line 19. Said second stream of secondary air is mixed with the effluent from second zone 16 and the resultant gaseous mixture is passed from line 18 into third zone 20, which contains a catalyst for the oxidation of carbon monoxide and hydrocarbons. In this third zone 20, substantially all of the carbon monoxide and hydrocarbons are oxidized and the purified gas stream coming from said third zone 20 is vented through line 21.

The amount of secondary air that is introduced into line 15 by way of line 17 is within the range of about 3 volume percent to about 8 volume percent of the amount of primary air that is employed in the combustion of the hydrocarbons in internal combustion engine 10. Moreover, the amount of secondary air that is introduced into line 18 by way of line 19 is sufficient to augment any oxygen remaining in the effluent passing through line 18 in order to provide substantially complete oxidation of the carbon monoxide and hydrocarbons contained in said effluent.

Such embodiment of the process of the present invention will provide a purified exhaust gas while maximizing the conversion of the oxides of nitrogen in such exhaust gas.

Example

The effect of the amount of secondary air added prior to the second zone on the net reduction of nitrogen oxides was studied. The exhaust gas to be purified was produced by a laboratory pulse-flame reactor (nitrogen-oxide generator) of the type described on page 1127 of S.A.E. TRANSACTIONS, Volume 80 (1971) in Paper No. 710291.

A three-catalyst system was provided. Two beds of catalyst were placed in a cylindrical container having a side arm for secondary air introduction into the container between the two catalyst beds. The catalyst in each bed was a catalyst comprising about 4 weight percent nickel and 0.025 weight percent rhodium on a monolithic ceramic support of Corning Ex-20. The first catalyst in this system, i.e., the catalyst that was closer to the inlet for the unpurified exhaust gas, was the nitrogen-oxide-reduction catalyst. The second catalyst represented the catalyst for decreasing ammonia. The effluent from the second catalyst was mixed with a second stream of secondary air and passed over a third catalyst to oxidize the carbon monoxide and the hydrocarbons contained in the effluent. This third catalyst was a pelleted platinum-on-alumina catalyst commercially prepared by and obtained from the Engelhard Minerals and Chemicals Corporation. Each of the catalysts was employed at a temperature of 930°F. and a space velocity of 72,000 hours$^{-1}$. Different amounts of secondary air were used at two carbonmonoxide-to-oxygen ratios, namely 2 and 5.

Figure 2:
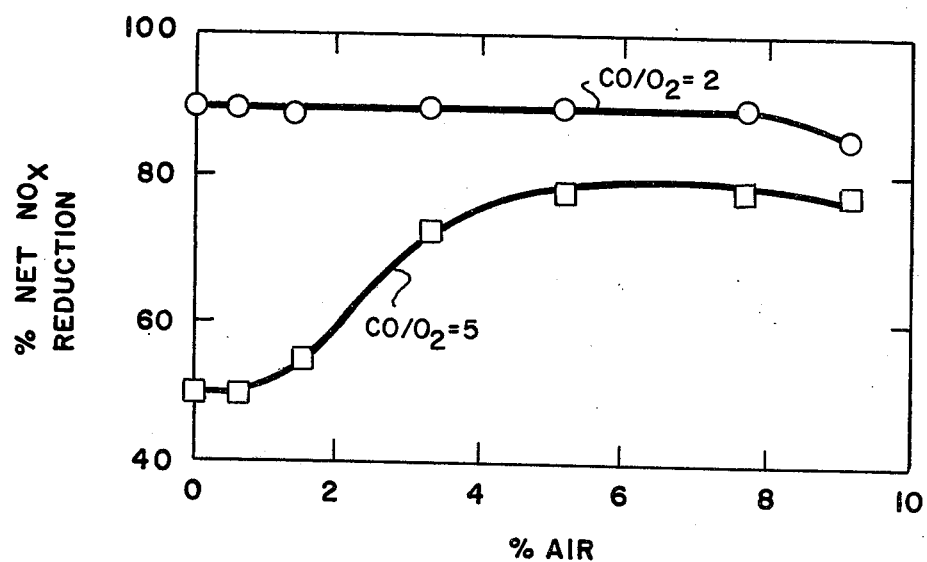
FIG. 2 shows the effect of the amount of secondary air being added to the effluent from the first zone of the process of the present invention prior to the introduction of said effluent into the second zone on the percent net $NO_x$ reduction.

The results of these tests are presented in FIG. 2. These results demonstrate that the best percent net reduction of nitrogen oxides occurs at a particular amount of secondary air being introduced between the first and second catalysts, which amount is within the range of about 3 volume percent to about 8 volume percent, based on the primary air that is introduced into the combustion chamber producing the exhaust gas.

The embodiments of the process of the present invention that are depicted in FIG. 1 and in the above example are presented for purposes of illustration only and are not intended to limit the scope of the process of the present invention.

What is claimed is:

1. A process for the purification of exhaust gas from the combustion of hydrocarbon materials to form a purified exhaust gas, which process comprises in sequence contacting said exhaust gas in a first zone with a nitrogen-oxide-reduction catalyst under reducing conditions to form a nitrogen-oxide-reduced gas containing ammonia; introducing a first stream of secondary air into said nitrogen-oxide-reduced gas to form a first air-gas mixture containing air in an amount that is sufficient to enable the ammonia in said first air-gas mixture to be decreased to a minimum level but insufficient to produce appreciable amounts of nitrogen oxides from said ammonia or to enable the hydrocarbons and carbon monoxide present in said first air-gas mixture to be appreciably oxidized, said first stream of secondary air providing about 3 volume percent to about 8 volume percent air, based on the volume of primary air being employed in said combustion; contacting said first air-gas mixture in a second zone with a catalyst for decreasing ammonia to form a gas containing decreased amounts of ammonia; introducing a second stream of secondary air into said gas containing decreased amounts of ammonia to form a second air-gas mixture, said second stream of secondary air being sufficient, when added to the oxygen remaining in said gas containing decreased amounts of ammonia, to provide substantially complete oxidation of the carbon monoxide and hydrocarbons in said gas containing decreased amounts of ammonia; and contacting said second air-gas mixture in a third zone with an oxidation catalyst for the oxidation of carbon monoxide and hydrocarbons to form said purified exhaust gas, said oxidation catalyst being a noble-metal catalyst that is suitable for the oxidation of carbon monoxide and hydrocarbons.

2. The process of claim 1 wherein said exhaust gas is an exhaust gas from an internal combustion engine.

3. The process of claim 2 wherein said nitrogen-oxide-reduction catalyst comprises nickel and rhodium on a monolithic ceramic support, said catalyst for decreasing ammonia comprises nickel and rhodium on a monolithic ceramic support, and said oxidation catalyst comprises platinum on alumina.

4. In a process for the purification of exhaust gas from the combustion of hydrocarbon materials wherein said exhaust gas is contacted with a nitrogen-oxide-reduction catalyst in a first zone under reducing conditions to reduce nitrogen oxides and to form a nitrogen-oxide-reduced gas and subsequently said nitrogen-oxide-reduced gas is contacted with an oxidation catalyst in a final zone to oxidize carbon monoxide and hydrocarbons, the improvement which comprises introducing a first stream of secondary air providing about 3 volume percent to about 8 volume percent air, based upon the volume of primary air being employed in said combustion, into said nitrogen-oxide-reduced gas to form a first air-gas mixture, said first stream being present in an amount sufficient to enable the ammonia in said nitrogen-oxide-reduced gas to be decreased to a minimum level but insufficient to produce appreciable amounts of nitrogen oxides from ammonia or to enable the hydrocarbons and carbon monoxide in said nitrogen-oxide-reduced gas to be appreciably oxidized, contacting in an intermediate zone said first air-gas mixture with a catalyst for decreasing ammonia to form a gas containing decreased amounts of ammonia, introducing a second stream of secondary air into said gas containing decreased amounts of ammonia to form a second air-gas mixture, and subsequently passing said second air-gas mixture into said final zone, said catalyst for decreasing ammonia comprising nickel and rhodium on a monolithic ceramic support and said second stream of secondary air being sufficient, when added to the oxygen remaining in said gas containing decreased amounts of ammonia, to provide substantially complete oxidation of the carbon monoxide and hydrocarbons in said gas containing decreased amounts of ammonia.

* * * * *

UNITED STATES PATENT OFFICE
CERTIFICATE OF CORRECTION

Patent No. 3,953,576   Dated April 27, 1976

Inventor(s) Garbis H. Meguerian et al.

It is certified that error appears in the above-identified patent and that said Letters Patent are hereby corrected as shown below:

Column 3, line 61, "third catalyst" should read -- third catalyst a catalyst --.

Signed and Sealed this

Fourteenth Day of December 1976

[SEAL]

Attest:

RUTH C. MASON
*Attesting Officer*

C. MARSHALL DANN
*Commissioner of Patents and Trademarks*